UNITED STATES PATENT OFFICE.

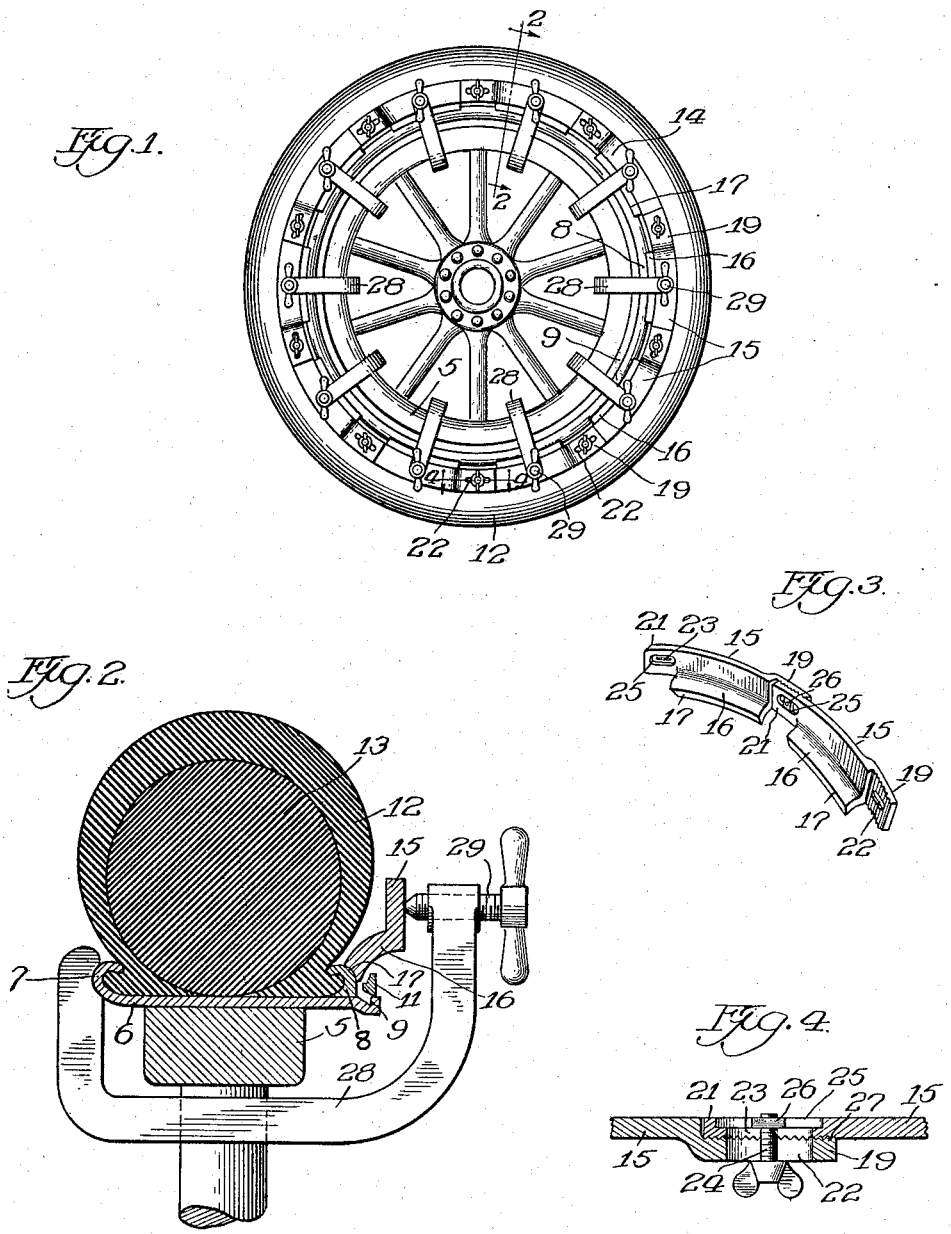

WILLIAM L. WEBER, OF CHICAGO, ILLINOIS, ASSIGNOR TO THE ESSENKAY PRODUCTS COMPANY, OF CHICAGO, ILLINOIS, A CORPORATION OF ILLINOIS.

TIRE-MOUNTING IMPLEMENT.

1,201,778.      Specification of Letters Patent.      Patented Oct. 17, 1916.

Application filed June 19, 1915. Serial No. 35,128.

*To all whom it may concern:*

Be it known that I, WILLIAM L. WEBER, a citizen of the United States, residing at Chicago, in the county of Cook and State of Illinois, have invented certain new and useful Improvements in Tire-Mounting Implements, of which the following is a specification.

My present invention relates to implements for mounting or applying vehicle tires to the rims and has more particular reference to devices of this character which are utilized in mounting tires equipped with a solid resilient filler, or with bridges, partitions or other solid walls or portions which prevent collapsing of the tire.

One of the primary objects of the present invention is the provision of an element in the form of an adjustable or expansible ring, adapted to engage the detachable flanges of rims on various sized wheels and force these flanges under pressure into position to be locked by the usual locking ring. Floating rings of this general character have been employed for forcing the detachable flanges into locking position prior to my present invention, but since these rings have not been made adjustable, it has been necessary for the installer to have on hand as many different sized rings as there are automobile wheel sizes. The ring contemplated by this invention, however, is adjustable and its size can be varied and accommodated to any size of wheel so that this single ring is enabled to perform the function of and supplant the large number of rings heretofore required for the various sized wheels.

Other objects of the invention are to provide a sectional ring which can be readily assembled and dismantled, to provide a simple and efficient means for adjustably securing the ring sections together and to so construct the individual sections that when assembled they will produce a strong rigid and durable ring.

Further objects and many of the attendant advantages of my invention will be manifest from the following description and accompanying drawings.

Referring to the drawings Figure 1 is a plan view of my invention in operative position on a wheel; Fig. 2 is a sectional view taken on the line 2—2 of Fig. 1; Fig. 3 is a perspective view of a fragment of my improved ring; and Fig. 4 is a fragmentary longitudinal sectional view showing the manner of connecting the ring sections.

On the drawings, reference character 5 designates the felly of a wheel of any preferred construction equipped with the rim 6, comprising the fixed flange 7 and the detachable flange 8. The rim shown for the purposes of illustration is formed to provide the annular groove 9 adapted to receive the locking ring 11 which locks the detachable flange 8 in position to hold the tire 12 in place.

The parts thus far described may be of any well known or preferred construction, several different types of flanges and locking means being now in common use.

When a pneumatic tire, which is inflated after being positioned on the rim, is used no special implements are required to force the flange 8 into position to permit the introduction of the locking ring. When, however, the tire is filled with a solid resilient filler 13, such as Essenkay for instance, which is quite extensively employed, or is equipped with solid bridges, walls, partitions or the like, implements are required to force the detachable flange inwardly against the resistance offered by the tire so that the locking ring may be positioned.

My present invention provides a ring suitable for mounting tires on wheels of various sizes and with this end in view the ring designated generally by reference character 14 comprises a series of sections 15 secured together to form the complete ring. Each ring section has a laterally and inwardly extending flange 16, preferably grooved at its edge as indicated by 17 to engage the detachable flange 8, and one end of each section is offset at 19 to overlie the opposite end 21 of an adjoining section. Elongated slots 22 and 23 are provided in the ends 19 and 21, respectively, and the sections are secured together by bolts 24 passed through these alined slots. To facilitate tightening of the bolts, the ends 21 are preferably grooved at 25 to accommodate the nuts 26 and prevent them from turning with the bolts. In order to obviate slippage between the sections the abutting faces of the ends are serrated or corrugated as indicated by 27.

In practice a sufficient number of ring sections are united to produce a ring of approximately the required diameter and then, before the bolts are tightened, the sections may be adjusted longitudinally by reason of the elongated slots until the grooved flanges 16 accurately engage the flange 8 around its perimeter. The bolts are then tightened to firmly clamp the sections together and produce a rigid ring of exactly the required size.

Since the flanges 8 of various makes differ in formation and external diameter it will be manifest that various adjustments of the ring 14 may be required for wheels of the same size in order to secure the proper engagement between the ring and the flange in any particular instance. My improved ring enables this adjustment to be made and a proper engagement to be effected, a result which could not be accomplished with the old style non-adjustable ring. When the ring has been properly adjusted and positioned it is forced inwardly against the flange 8 as shown in Fig. 2 by means of a number of well known clamps 28, carrying tightening screws 29 or other preferred clamping means. After the flange 8 has been forced inwardly the requisite distance the locking ring 11 may be inserted in the usual manner. In case it is desirable to use the ring in connection with a larger wheel the ring may be expanded to the required size by simply loosening the bolts 24 and separating the sections the requisite amount, or, if the required size cannot be attained by such adjustment between the sections, one or more sections may be added to or taken from the ring as requirements dictate. The flange 16 is arched in cross-section, so as to give sufficient space between said flange and the grooved edge portion of the rim 6, to facilitate the introduction of the locking ring 11 after the tire has been compressed. By reason of the serrations or grooves of one ring section fitting in serrations or grooves of the adjacent ring section, the ring sections are held together rigidly, wherefore the present device has all of the advantages of an integral ring, while at the same time it is readily adjustable, by the addition or removal of ring sections, to fit wheels of different sizes.

My invention and one of its preferred embodiments will be understood from the foregoing and it will be obvious that the structural details shown and described are capable of considerable variation without departure from the essence of the invention as set forth in the following claims.

I claim:

1. A tire-mounting implement, consisting of an adjustable ring comprising a plurality of overlapping sections, each provided with a laterally projecting transversely arched flange shaped to fit the detachable flange of an automobile wheel and having elongated slots at each end thereof, and means passing through the slots to adjustably connect the sections together.

2. A tire-mounting implement, comprising a series of ring sections each provided at each end with an offset portion equipped with a longitudinal slot and a serrated face, and having intermediate its ends a laterally projecting transversely arched flange shaped to fit the detachable flange of an automobile wheel, and bolts passing through the alined slots of the overlapping ends whereby said ends are adjustably connected together.

WILLIAM L. WEBER.

Copies of this patent may be obtained for five cents each, by addressing the "Commissioner of Patents, Washington, D. C."